(12) United States Patent
Dakshinyam et al.

(10) Patent No.: US 10,841,153 B2
(45) Date of Patent: Nov. 17, 2020

(54) DISTRIBUTED LEDGER TECHNOLOGY NETWORK PROVISIONER

(71) Applicant: BANK OF AMERICA CORPORATION, Charlotte, NC (US)

(72) Inventors: Srinivasa Rao Dakshinyam, Telangana (IN); Shashank Raju Birudharaju, Telangana (IN); Govinda Rajulu Nelluri, Telangana (IN)

(73) Assignee: BANK OF AMERICA CORPORATION, Charlotte, NC (US)

( * ) Notice: Subject to any disclaimer, the term of this patent is extended or adjusted under 35 U.S.C. 154(b) by 42 days.

(21) Appl. No.: 16/209,733

(22) Filed: Dec. 4, 2018

(65) Prior Publication Data

US 2020/0177448 A1 Jun. 4, 2020

(51) Int. Cl.
| | |
|---|---|
| *G06F 15/16* | (2006.01) |
| *H04L 12/24* | (2006.01) |
| *G06F 16/18* | (2019.01) |
| *G06F 16/182* | (2019.01) |
| *G06N 20/00* | (2019.01) |

(52) U.S. Cl.
CPC ...... *H04L 41/0806* (2013.01); *G06F 16/1805* (2019.01); *G06F 16/1824* (2019.01); *G06N 20/00* (2019.01)

(58) Field of Classification Search
CPC ............. H04L 41/0806; G06F 16/1805; G06F 16/1824; G06N 20/00
See application file for complete search history.

(56) References Cited

U.S. PATENT DOCUMENTS

| | | | |
|---|---|---|---|
| 10,572,684 B2 * | 2/2020 | LaFever | G06F 21/6254 |
| 2005/0246415 A1 * | 11/2005 | Belfiore | G06F 16/958 |
| | | | 709/203 |
| 2006/0239206 A1 | 10/2006 | Rao et al. | |
| 2006/0294381 A1 | 12/2006 | Mitchell et al. | |
| 2007/0061878 A1 | 3/2007 | Hagiu et al. | |
| 2007/0294309 A1 * | 12/2007 | Shwartz | H04L 67/104 |
| 2012/0311339 A1 | 12/2012 | Irvine | |
| 2013/0061049 A1 | 3/2013 | Irvine | |
| 2014/0022977 A1 * | 1/2014 | Hegge | H04W 72/005 |
| | | | 370/312 |
| 2014/0075518 A1 | 3/2014 | D'Souza et al. | |
| 2015/0244690 A1 | 8/2015 | Mossbarger | |
| 2015/0310188 A1 | 10/2015 | Ford et al. | |
| 2015/0333957 A1 * | 11/2015 | James | H04L 41/0806 |
| | | | 709/220 |
| 2016/0321654 A1 | 11/2016 | Lesavich et al. | |
| 2016/0330027 A1 | 11/2016 | Ebrahimi | |
| 2017/0041296 A1 * | 2/2017 | Ford | H04W 12/06 |

(Continued)

*Primary Examiner* — Moustafa M Meky
*Assistant Examiner* — Thorne E Waugh
(74) *Attorney, Agent, or Firm* — Michael A. Springs; Moore & Van Allen PLLC; Nicholas C. Russell

(57) ABSTRACT

A system for intelligently provisioning a distributed ledger technology (DLT) network may be configured to receive requests from authorized users to provision a DLT network based on a plurality of preset parameters. The system may further be configured to generate a script, using machine learning or other artificial intelligence algorithms, for provisioning the DLT network according to the preset parameters. One or more nodes in the DLT network can then execute the intelligently generated script to provision the DLT network as requested.

17 Claims, 3 Drawing Sheets

(56) References Cited

U.S. PATENT DOCUMENTS

| | | |
|---|---|---|
| 2017/0195336 A1 | 7/2017 | Ouellette |
| 2018/0159688 A1* | 6/2018 | Staple .................. H04L 9/30 |
| 2019/0012249 A1 | 1/2019 | Mercuri et al. |
| 2019/0013932 A1 | 1/2019 | Maino et al. |
| 2019/0013933 A1 | 1/2019 | Mercuri et al. |
| 2019/0013934 A1 | 1/2019 | Mercuri et al. |
| 2019/0013948 A1 | 1/2019 | Mercuri et al. |
| 2019/0036957 A1* | 1/2019 | Smith .................. H04L 63/101 |
| 2019/0104196 A1* | 4/2019 | Li ........................ G06Q 20/382 |
| 2019/0207813 A1* | 7/2019 | Uehara ................ H04L 9/0643 |
| 2019/0238550 A1 | 8/2019 | Zhang et al. |
| 2019/0244294 A1* | 8/2019 | Shao ..................... G06F 9/547 |
| 2019/0379544 A1* | 12/2019 | Suthar .................. H04L 63/08 |
| 2019/0392164 A1* | 12/2019 | Dutta ................... G06F 21/602 |
| 2020/0026785 A1* | 1/2020 | Patangia ............... H04L 63/123 |
| 2020/0104177 A1* | 4/2020 | Inokuchi ................ G06F 16/28 |
| 2020/0110740 A1 | 4/2020 | Li et al. |
| 2020/0167319 A1 | 5/2020 | Fritz et al. |

\* cited by examiner

DISTRIBUTED LEDGER TECHNOLOGY NETWORK PROVISIONER

FIELD OF THE INVENTION

The present disclosure embraces a system, computer program product, and computer-implemented method for provisioning a distributed ledger technology (DLT) network on one or more designated nodes.

BACKGROUND

Within an enterprise, authorized users of the enterprise's systems frequently require use of customized DLT network in order to test, deploy, or otherwise implement various applications on individual nodes or across the given DLT network. At present, authorized users have to request certain resources in order to provision the DLT network required to test, deploy or implement the applications. Indeed, depending on the particular requirements for the DLT network, it may take several weeks in order to provision a DLT network according to the user's specifications. Therefore, a need exists for a system that can intelligently provision a DLT network according to the requirements provided by an authorized user. The present invention is directed at accomplishing this aim.

BRIEF SUMMARY

The following presents a simplified summary of one or more embodiments of the invention in order to provide a basic understanding of such embodiments. This summary is not an extensive overview of all embodiments, and is intended to neither identify key or critical elements of all embodiments, nor delineate the scope of any or all embodiments. Its sole purpose is to present some concepts of one or more embodiments in a simplified form as a prelude to the more detailed description that is presented later.

Embodiments of the present invention relate to systems, computer program products, and methods for provisioning distributed ledger technology (DLT) networks. Embodiments of the present invention comprise one or more processor components, one or more memory components operatively coupled to the one or more processor components, and computer-readable instructions stored on the one or more memory components configured to cause the one or more processor components to receive a request from an authorized user to provision a DLT network, identify, based on the request received from an authorized user, a set of parameters required to provision the DLT network; generate a script to provision the DLT network, wherein the script comprises a series of executable instructions based on the identified set of parameters instructing one or more nodes to provision a DLT network, transmit, to one or more nodes, the generated script to provision the DLT network, and executing the generated script to provision the DLT network.

In additional or alternative embodiments of the invention as described herein, the parameters comprise at least one of a number of nodes in the provisioned DLT network, a network infrastructure, a ledger type, a programming language, or a database.

In additional or alternative embodiments of the invention as described herein, generating as script to provision the DLT network further comprises sequencing the series of executable instructions.

In embodiments where the executable instructions are sequenced as described above, transmitting the generated script to provision the DLT network may comprise receiving an indication from a node when an executable instruction has been completed by the node and transmitting the next executable instruction in the sequenced series of executable instructions.

In additional or alternative embodiments, transmitting the generated script to one or more nodes may comprise communicating over a network with a network provisioning adapter located at the one or more nodes.

In additional or alternative embodiments of the invention, identifying a set of parameters required to provision the DLT network may further comprise receiving, via the request from the authorized user, a partial set of parameters for the DLT network, comparing the partial set of parameters to the parameters of existing DLT networks, wherein the parameters of existing DLT networks are stored in a database/configuration communicatively coupled to the system, and determining one or more missing parameters based on the comparison of the partial set of parameters to the parameters of existing DLT networks.

In additional or alternative embodiments, the system may further store the identified set of parameters in a database/configuration communicatively coupled to the system.

DETAILED DESCRIPTION OF EMBODIMENTS OF THE INVENTION

Figure 1:
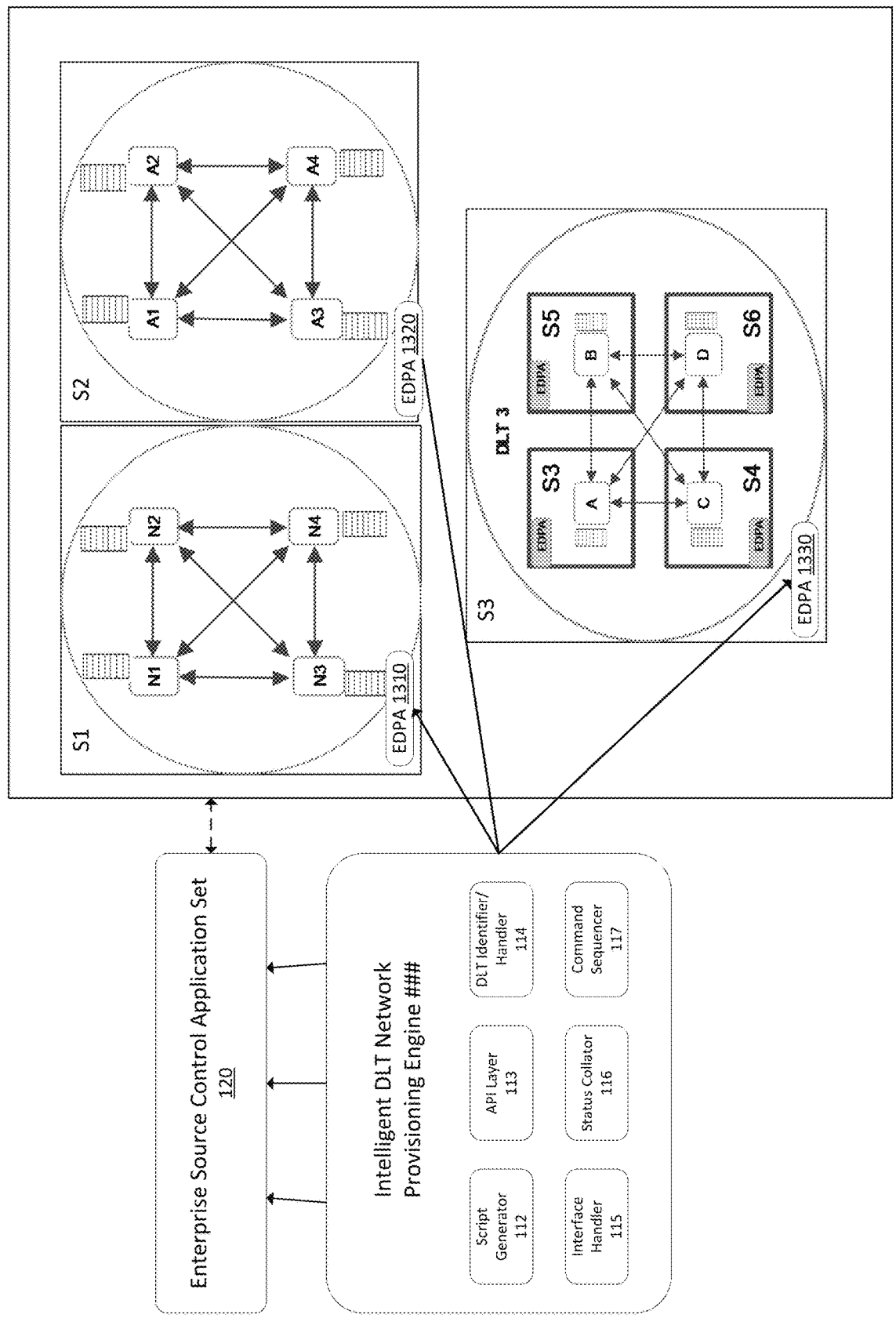
FIG. 1 is a system diagram depicting an exemplary embodiment of the invention.

Embodiments of the present invention will now be described more fully hereinafter with reference to the accompanying drawings, in which some, but not all, embodiments of the invention are shown. Indeed, the invention may be embodied in many different forms and should not be construed as limited to the embodiments set forth herein; rather, these embodiments are provided so that this disclosure will satisfy applicable legal requirements. Like numbers refer to elements throughout. Where possible, any terms expressed in the singular form herein are meant to also include the plural form and vice versa, unless explicitly stated otherwise. Also, as used herein, the term "a" and/or "an" shall mean "one or more," even though the phrase "one or more" is also used herein.

"Entity" as used herein may refer to an individual or an organization that owns and/or operates an online system of networked computing devices, systems, and/or peripheral devices on which the extended recognition system described herein is implemented. The entity may be a business organization, a non-profit organization, a government organization, and the like.

"Entity system" as used herein may refer to the computing systems and/or other resources used by the entity to execute DLT and non-DLT functions.

"User" as used herein may refer to an individual who may interact with the entity system. Accordingly, the user may be an employee, associate, contractor, or other authorized party who may access, use, administrate, maintain, and/or manage the computing systems within the entity system.

"Computing system" or "computing device" as used herein may refer to a networked computing device within the entity system. The computing system may include a processor, a non-transitory storage medium, a communications device, and a display. The computing system may support user logins and inputs from any combination of similar or disparate devices. Accordingly, the computing system may be a portable electronic device such as a smartphone, tablet, single board computer, smart device, or laptop, or the computing system may be a stationary unit such as a personal desktop computer or networked terminal within an entity's premises. In some embodiments, the computing system may be a local or remote server which is configured to send and/or receive inputs from other computing systems on the network.

"Distributed ledger" or "distributed electronic ledger" as used herein may refer to a structured list of data records that is decentralized and distributed amongst a plurality of computing systems and devices. In some embodiments, the distributed ledger may be a blockchain ledger. "Node" as used herein may refer to a computing system on which the distributed ledger is hosted. Typically, each node maintains a full copy of the distributed ledger.

"Distributed ledger technology network" or "DLT network" as used herein may refer to a network of servers, computer systems or other computing devices configured to perform at least some DLT-functions.

"Consensus," "consensus algorithm," or "consensus mechanism" as used herein may refer to the process or processes by which nodes come to an agreement with respect to the contents of the distributed ledger. Typically, changes to the ledger (e.g., addition of data records) may require consensus to be reached by the nodes in order to become a part of the authentic version of the ledger. The nodes may use various different mechanisms or algorithms to obtain consensus, such as proof-of-work ("PoW"), proof-of-stake ("PoS"), practical byzantine fault tolerance ("PBFT"), or the like.

"Resource" as used herein may refer an object which is typically transferred between the third party and the entity. The object may be tangible or intangible objects such as computing resources, data files, documents, funds, and the like.

Embodiments of the present disclosure provide a system, computer program product, and method for intelligently provisioning a DLT network based upon a set of parameters provided by an authorized user. In particular, the system may be configured to provide a DLT network on the private/public cloud infrastructure (e.g., Docker, Kubernetes, Openshift, etc.). In certain instances, an authorized user may request a particular DLT network with certain parameters, including the number of DLT nodes, the network infrastructure, ledger type, programming language, and database. Upon receipt of these parameters from an authorized user, the intelligent DLT provisioning system has all of the information necessary in order to provision a DLT network according to the authorized user's requirements.

In general, the DLT networks as described herein are comprised of a number of nodes connected of a network. The nodes may be a server or other computing device that is capable of performing DLT functions, including communication with other nodes on the DLT network, executing consensus algorithms to determine contents of a distributed ledger (e.g., validating data records and/or approving or rejecting additional data records), forming smart contracts, or the like. In a DLT network, some nodes may be permissioned, while other nodes are not—in other words, only a subset of all of the nodes in a DLT network may be able to participate in the performing the consensus algorithm or other DLT-functions affecting the distributed ledger. In DLT networks as described herein, the nodes may exist on a variety of commercially available private/public cloud infrastructures, including Docker, Kubernets, Openshift, and the like. The various infrastructures may be established to serve different uses, depending on the needs of the authorized user. Further, a user may require different ledger types to establish the distributed ledger on the DLT network. For example, different use case may be well suited for Corda, while other use cases may require Hyperledger Fabric, Ethereum, or some other commercially available distributed ledger. Lastly, the DLT networks provisioned according to embodiments of the present invention may use specific programming languages to perform the DLT-functions (e.g., node.js) and require access to specific relational or memory databases.

FIG. 1 is a system diagram of the intelligent DLT network provisioning system. As shown in FIG. 1, the system comprises an intelligent DLT network provisioning engine 110, an enterprise source control application set 120, and one or more provisioned DLT networks 130. As further shown in FIG. 1, the intelligent DLT network provisioning engine 110 is comprised of several sub-components, namely a script generator 112, an application programming interface (API) layer 113, a DLT identifier/handler 114, an interface handler 115, a status collator 116, and a command sequencer 117. Collectively, these components handle all of the tasks necessary to receive an authorized user's requirements and provision one or more DLT networks according to such requirements. A more detailed description of each component of the intelligent DLT network provisioning engine 110 is set forth below.

The script generator 112 enables the intelligent DLT network provisioning engine 110 to generate DLT and operating system specific instruction which are orchestrated to create a DLT node and/or network. The script generator 112 leverages industry-standard markup languages (e.g., raml, swagger, yaml, and the like) in order to communicate with the respective operating system and related technology.

The application programming interface (API) layer 113 is responsible for communicating with the enterprise DLT network provisioning adapters (EDPAs) which are described in more detail below. The API layer also allows the intelligent DLT network provisioning engine 110 to communicate with a web interface or other interfacing platform for receiving the authorized user's requirements to establish and provision the DLT network.

The DLT identifier/handler 114 is a software component of the intelligent DLT network provisioning engine 110 that is used to maintain the information related to the respective provisioned DLT networks 130. For example, the DLT identifier/handler may store information such as the tech stack (i.e., the combination of programming languages, tools and frameworks) for the applicable DLT network and the dependency information for the same. The DLT identifier/handler 114 is configured to maintain both front-end and back-end information for the respective DLT networks. Further, the DLT identifier/handler includes functionality to identify information (e.g., tech stack and dependency information) for a provisioned DLT network, whether or not such information was already stored in the DLT identifier/handler 114. Indeed, the DLT identifier/handler may leverage machine learning (e.g., neural networks and the like) algorithms to identify DLT network information for a given DLT network based upon the stored information on DLT networks already on the DLT identifier/handler 114.

The interface handler 115 is an additional software component of intelligent DLT network provisioning engine 110 that is responsible for giving the provisioning mechanism a means for interacting with required interfaces. For example, the provisioning mechanism may need to interact with one or more code repositories, operating system calls, external APIs, external libraries, and the like. The interface handler 115 provides the means for the intelligent DLT network provisioning engine 110 to interact with the foregoing.

The status collator 116 is responsible for enabling the servicing of multiple types of requests and orchestrating such requests based on order of precedence. The status collator 116 must understand the requirements for setting up the requested DLT network according to the authorized user's parameters in order to orchestrate the DLT setup. Further, the status collator 116 must be able to determine the current status of the network provisioning and respond to additional requests in order to determine the next steps in the provisioning process.

Lastly, the intelligent DLT network provisioning engine 110 comprises a command sequencer 117. The command sequencer 117 provides a dynamic sequencing mechanism of commands to be executed on the respective nodes in order to provision the DLT network according to the authorized user's requirements. Specifically, the command sequencer 117 interfaces directly with the Enterprise DLT Network Provisioning Adapter (EDPA) on a particular network or node in order to arrange for the specific commands to be executed on that network or node.

The EDPAs 1310, 1320, and 1330 work in connection with the command sequencer 117, but as opposed to existing on the intelligent DLT network provisioning engine 110, are installed in the private/public cloud servers that receive the commands from the DLT network provisioning engine in accordance with the processes described herein. Along with the provisioning components from the Enterprise source Control Toolset described in more detail below, the EDPA executes the commands received from the intelligent DLT network provisioning engine 110 (and specifically, the command sequencer 117). In addition, the EDPAs are responsible for relaying status updates for execution of the commands back to the intelligent DLT network provisioning engine 110, allowing the status collator 116 and the command sequencer 117 to determine and issue the next set of commands in the provisioning process, respectively.

In some embodiments, the system may further comprise a configuration interface. The configuration interface may be hosted on the local computing device of an authorized user and permit the authorized user to request the provisioning services of the intelligent DLT network provisioning engine 110 and input requirements for the same.

As also shown in FIG. 1, the intelligent DLT network provisioning engine 110 is in operative communication with the enterprise source control application set 120. The enterprise source control application set may comprise a suite of applications necessary for use by the various components of the intelligent DLT network provisioning engine 110 in order to successfully provision the DLT network according to the authorized user's requirements. For example, the enterprise source control application set may include Bitbucket, Artifactory, SCCM, and the like. The application suites comprising the enterprise source control application set 120 may be stored remotely and be accessible to computing systems across the entire enterprise, or may be available locally to the intelligent DLT network provisioning engine 110.

Also shown in FIG. 1 are provisioned DLT networks S1, S2, and S3. As shown in FIG. 1, the intelligent DLT network provisioning engine 110 is capable of provisioning DLT network S1, S2, and S3 according to the authorized user's requirements. Each DLT network S1, S2 as shown in FIG. 1 has four nodes (N1, N2, N3, and N4 for DLT network S1; A1 A2, A3 and A4 for S2). Alternatively, the DLT networks may be comprised of multiple DLT networks, as shown with DLT networks S3, S4, S5, and S6, which respectively comprise nodes A, B, C, and D. Each DLT Network also has an EDPA, as described above.

Figure 2:
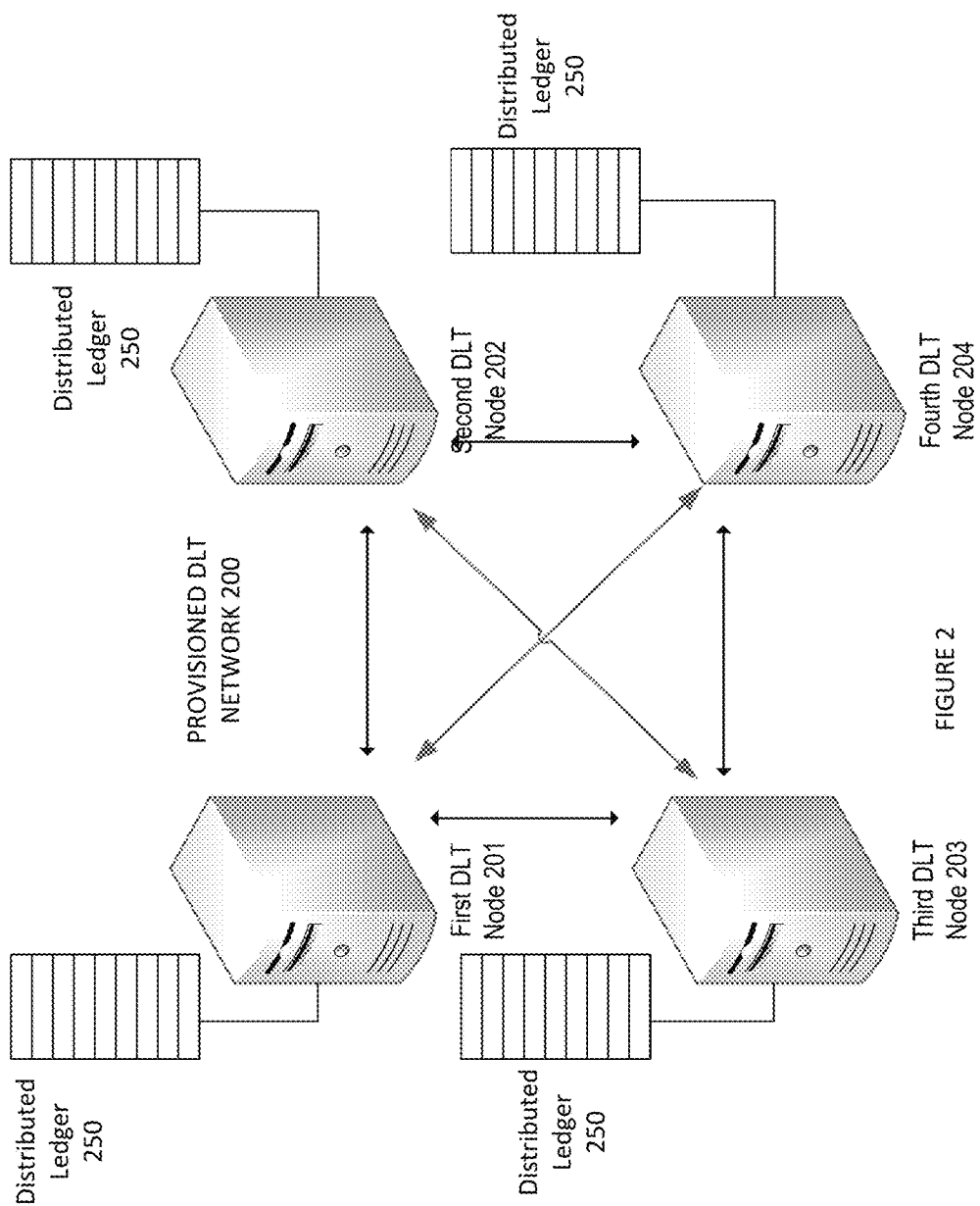
FIG. 2 is a system diagram depicting a provisioned DLT network according to embodiments of the invention.

FIG. 2 depicts a more detailed system diagram of a fully provisioned DLT network 200 according to embodiments of the invention as described herein. As shown in FIG. 2, the DLT network 200 is comprised of one or more nodes (specifically, the DLT network 200 in FIG. 2 has 4 nodes, but it is understood that the DLT networks provisioned according to embodiments described herein may have any number of nodes). Each node in the DLT network 200 is in operative communication with the other nodes in the DLT network 200, in order to facilitate necessary DLT functionality. The DLT network 200 may be a global area network (GAN) such as the Internet, a wide area network (WAN), a local area network (LAN) or any other type of network or combination of networks in accordance with the requirements provided by the authorized user. The network may provide for wireline, wireless or a combination of wireline and wireless communication between devices on the network.

As shown, the DLT network 200 of FIG. 2 is comprised of a first DLT node 201, a second DLT node 202, a third DLT node 203, and a fourth DLT node 204. Each node also has a copy of a distributed ledger 250, which should be the same on each node. In order to conduct transactions on the DLT network 200, each node needs to append its copy of the distributed ledger 250 with the same information as the other nodes on the DLT network 200. Embodiments of the present invention as described herein can configured the DLT network 200 (and the corresponding nodes comprising the DLT network 200) to perform these functions in any manner, including by consensus algorithm, smart contract logic, or the like.

It should be understood by those having ordinary skill in the art that although the first DLT node 201, second DLT node 202, third DLT node 203, and fourth DLT node 204 are depicted as single units, each of the depicted components, or sub-components therein, may represent multiple units. In some embodiments, a given computing system as depicted in FIG. 2 may represent multiple systems configured to operate in a distributed fashion. For instance, the first DLT node 201 may represent a plurality of computing system operating in a distributed fashion. In other embodiments, the functions of multiple computing systems may be accomplished by a single system. For instance, the functions of the second DLT node 202 may, in some embodiments, be executed on a single computing system according to the authorized user's need to efficiently distribute computing workloads.

Figure 3:
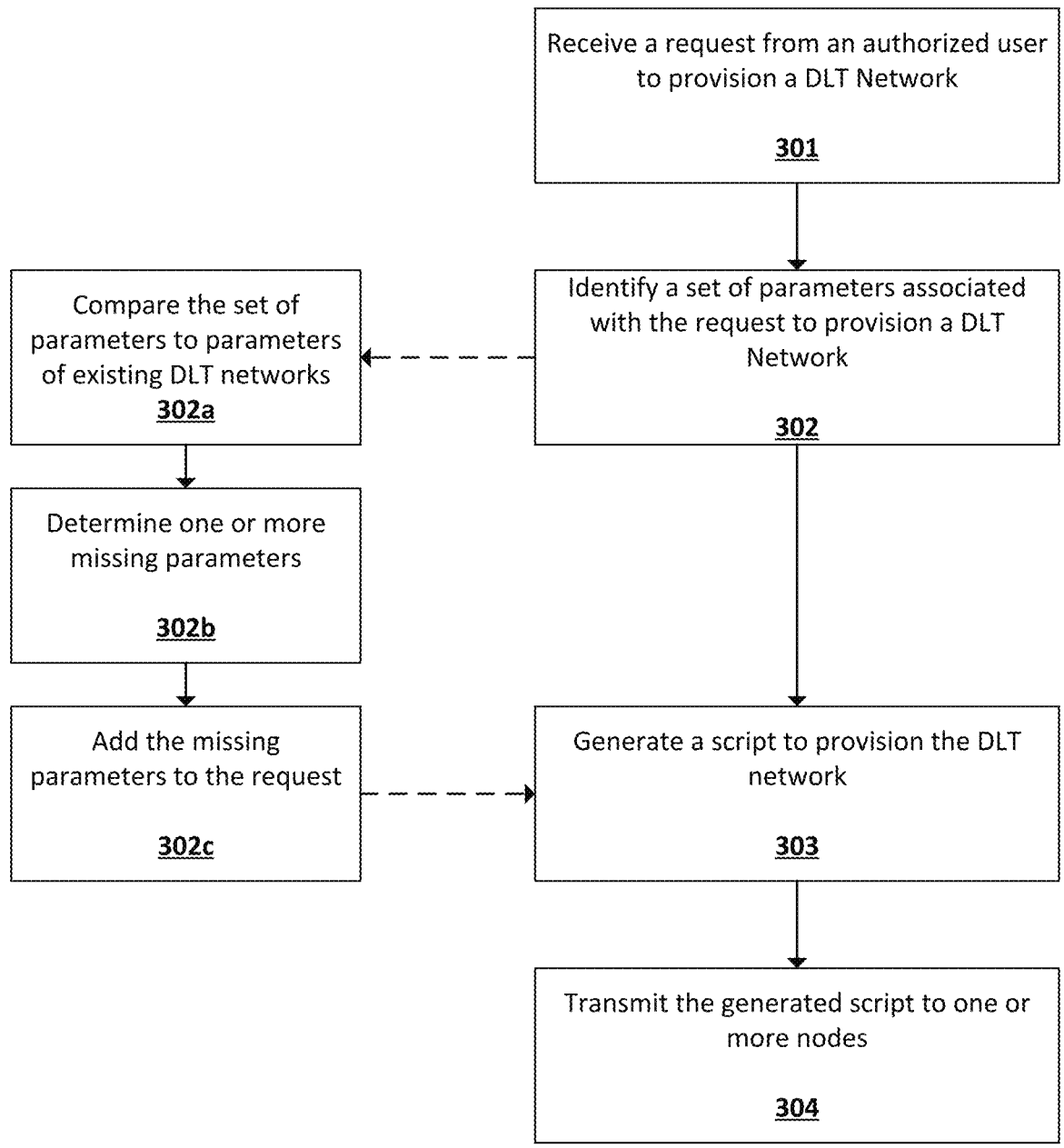
FIG. 3 is a process flow depicting an operational flow chart in accordance with embodiments of the invention.

FIG. 3 is a process flow depicting a typical process by which embodiments of the present invention may operate. In that regard, the process flow depicted in FIG. 3 is conducted by elements of the system as described in more detail with respect to FIGS. 1 and 2 above in order to intelligently provision a DLT Network.

As shown in FIG. 3, a typical process begins at block 301, where an authorized user submits a request to provision a DLT network. In some embodiments, an entity may limit the number of authorized users who may use the entity's resources to provision DLT networks and prohibit users without such authorization from provisioning DLT networks on the system as described herein.

In addition, an authorized user may access a request portal or other means of submitting a request to provision a DLT network through a configuration interface, as described above. The configuration interface may allow the authorized user to submit requests to the DLT network provisioning system from a graphical user interface hosted on the authorized user's computer that is in operative communication with the intelligent DLT network provisioning engine 110. In other embodiments, users may simply submit requests to provision DLT network through a command line type interface or the like.

Typically, an authorized user's request to provision a DLT network will specify one or more parameters that the user requires for the provisioned DLT network. The one or more parameters may include a number of nodes to be included in the DLT network (including if there will be any permissioned or non-permissioned nodes), a network infrastructure, a ledger type, a programming language, and/or a database. In some embodiments, the authorized user may be able to select the one or more parameters from a drop down menu in the configuration interface. In still other embodiments, and as described in more detail below, the user may provide only portion of the parameters required to provision the DLT network, allowing the system to determine the remaining parameters as necessary.

At block 302, the system will identify a set of parameters required to provision the DLT network requested by the authorized user. If the user has input all of the requested parameters, identifying the requested parameters may be as simple as parsing the user's request to identify the requested parameters—e.g., the number of nodes, ledger type, and the like. However, in some instances, an authorized user may not enter a request that the system immediately recognizes, in which case the DLT Identifier/Handler 114 may have to perform additional tasks to identify the parameters of the requested DLT network.

As noted above, the DLT identifier/handler 114 is a software component that maintains information relating to provisioned DLT networks. For example, the DLT identifier/handler may store information such as the tech stack (i.e., the combination of programming languages, tools and frameworks) for the applicable DLT network and the dependency information for the same. Thus, if the DLT identifier/handler is able to identify the authorized user's request without any further work, the other elements of the intelligent DLT network provisioning engine 110 described herein can begin the tasks associated with provisioning the requested DLT network.

In some instances, however, the DLT identifier/handler 114 may not be able to immediately identify the parameters associated with the authorized user's request, and additional steps must be performed before the DLT network can be provisioned. Such additional steps may be required if, for example, the authorized user's request contains an incomplete set of parameters, or if the authorized user requests a combination of parameters that are incompatible with one another, or if for any other reason the DLT identifier/handler is unable to recognize one or more of the requested parameters. In such an instance, the DLT identifier/handler steps will proceed to block 302*a*.

As depicted at block 302*a*, the system (typically via the DLT identifier/handler 114) compares the set of parameters requested from the authorized user to the sets of parameters for DLT networks the system has previously provisioned or otherwise has parameter level information on. As noted above, the DLT identifier/handler stores and has access to the parameters used in existing or previously provisioned DLT networks. In many cases, the stored parameter data is stored by the system itself when it provisions a DLT network, though it should be understood that certain parameter data for some DLT networks may be input to the DLT identifier/handler 114 by another source, such as by manual entry. Further, the DLT identifier/handler may store such information in a separate server communicatively coupled to the DLT identifier/handler 114 and accessible over a public or private network.

To perform the comparison as depicted in block 302*a*, the DLT identifier/handler 114 may use any commonly available comparison algorithm to compare the requested parameters and known parameters. At block 302*b*, the DLT identifier/handler determines any missing parameters in the requested set of parameters based on the results of the comparison performed at block 302*a*. For example, the authorized user may a DLT network with only two parameters (e.g., the number of nodes and the infrastructure type). The DLT identifier/handler 114 may then compare the requested parameters with other DLT networks that had the same two parameters, and determine that most such DLT networks were requested with a specific ledger type. The DLT identifier/handler 114 may then use this comparison result to determine that the requested parameters should include the specific ledger type.

As the DLT provisioner system is used more often, the system may employ machine learning algorithms at the DLT identifier/handler to better predict missing and/or incorrect parameters. After the DLT identifier/handler 114 has been adequately "trained" according to the machine learning algorithm, the system will then accurately be able to provision DLT networks based on fewer parameters/information, thereby improving the accuracy of the system and reducing the amount of time required to provision new DLT networks according to the processes described herein.

At block 302*c*, the system then adds the missing parameters identified at block 302*b* to the request received at block 301. In effect, the requested parameters are now include any of the missing parameters identified through the comparison process described above, and the provision of the DLT network according to embodiments of the invention as described herein can proceed.

Once all of the parameters have been accurately determined (either at block 302 or by the comparison process described at blocks 302*a* through 302*c*), the system next generates a script to provision the DLT network as depicted at block 303. Typically this step is performed by the script generator 112 described above. As discussed, the script generator 112 is responsible for generating DLT and operating system specific instructions which are orchestrated by the components of the DLT provisioning system to provision the requested DLT network. In particular, the script generator uses industry-standard markup language (e.g., raml, swagger, yaml and the like) in order to generate instructions for provisioning a DLT network according to the authorized user's requested parameters. In many cases, the specific industry-standard markup language used by the script generator 112 may be determined by the specified parameters from the authorized user.

Specifically, the generated script will comprise a series executable instructions to be performed at the specified node or nodes to comprise the DLT network. As discussed in more detail above, the script generator 112 and the command sequencer 117 will communicate with one another in order to take the generated script from the script generator 112 and sequence the executable instructions to accurately and efficient provision the DLT network as requested. Certain DLT implementations may require that different executable instructions be performed (or not performed) and in some instances, be performed in a different sequence. The script generator 112 and the command sequencer coordinate these responsibilities.

Further, the script generator 112 may interact with the interface handler 115 to communicate with other required interfaces and gain access to code repositories, operating system calls, external APIs, libraries, and the like. The script generator 112 requires access to other interfaces in order to generate the scripts according to the parameters provided by the authorized user.

Once the script generator 112 has completed generating the script as depicted at block 303, the DLT network provision engine 110 progress to block 304, where it begins transmitting the executable instructions generated by the script generator 112. As alluded to above, the executable instructions are sequenced by the command sequencer 117, which also is responsible for transmitting the sequenced executable instruction to the enterprise DLT network provisioning adapters (1310, 1320, and 1330) located on the DLT network(s) and/or node(s).

Transmitting the executable instructions to the DLT networks(s) and/or nodes(s) also comprises receiving status updates from the network(s) and/or node(s) as to their respective progress on implementing the executables. Such communication is necessary so that instructions are not transmitted before they can be completed. In order to monitor such status, the status collator 116 is also in operative communication with the other modules discussed herein to receive and track the status of a network provisioning job, and to determine when executable instructions need to be delivered to the respective enterprise DLT network provisioning adapters for the DLT network(s) and/or nodes being provisioned.

At the completion of block 304 (and once all of the executable instructions have been successfully executed by the respective DLT network(s) and/or nodes(s)), the requested DLT network should be fully provisioned according to the requested parameters received from the authorized user. Once such steps have been successfully completed, the intelligent DLT network provisioning engine 110 may communicate back to the user that the requested DLT network is fully provisioned, thereby allowing the user to utilize the DLT network for its intended purpose. Alternatively, the system may be configured to perform further tests to ensure that the provisioned DLT network is operable in accordance with all of the user's requested provisions.

As will be appreciated by one of ordinary skill in the art, the present invention may be embodied as an apparatus (including, for example, a system, a machine, a device, a computer program product, and/or the like), as a method (including, for example, a computer-implemented process), or as any combination of the foregoing. Accordingly, embodiments of the present invention may take the form of an entirely software embodiment (including firmware, resident software, micro-code, and the like), an entirely hardware embodiment, or an embodiment combining software and hardware aspects that may generally be referred to herein as a "system." Furthermore, embodiments of the present invention may take the form of a computer program product that includes a computer-readable storage medium having computer-executable program code portions stored therein. As used herein, a processor may be "configured to" perform a certain function in a variety of ways, including, for example, by having one or more special-purpose circuits perform the functions by executing one or more computer-executable program code portions embodied in a computer-readable medium, and/or having one or more application-specific circuits perform the function. As such, once the software and/or hardware of the claimed invention is implemented the computer device and application-specific circuits associated therewith are deemed specialized computer devices capable of improving technology associated with software-defined radio systems and machine learning algorithms to be performed thereon.

It will be understood that any suitable computer-readable medium may be utilized. The computer-readable medium may include, but is not limited to, a non-transitory computer-readable medium, such as a tangible electronic, magnetic, optical, infrared, electromagnetic, and/or semiconductor system, apparatus, and/or device. For example, in some embodiments, the non-transitory computer-readable medium includes a tangible medium such as a portable computer diskette, a hard disk, a random access memory (RAM), a read-only memory (ROM), an erasable programmable read-only memory (EPROM or Flash memory), a compact disc read-only memory (CD-ROM), and/or some other tangible optical and/or magnetic storage device. In other embodiments of the present invention, however, the computer-readable medium may be transitory, such as a propagation signal including computer-executable program code portions embodied therein.

It will also be understood that one or more computer-executable program code portions for carrying out the specialized operations of the present invention may be required on the specialized computer including object-oriented, scripted, and/or unscripted programming languages, such as, for example, Java, Perl, Smalltalk, C++, SAS, SQL, Python, Objective C, and/or the like. In some embodiments, the one or more computer-executable program code portions for carrying out operations of embodiments of the present invention are written in conventional procedural programming languages, such as the "C" programming languages and/or similar programming languages. The computer program code may alternatively or additionally be written in one or more multi-paradigm programming languages, such as, for example, F #.

It will further be understood that some embodiments of the present invention are described herein with reference to flowchart illustrations and/or block diagrams of systems, methods, and/or computer program products. It will be understood that each block included in the flowchart illustrations and/or block diagrams, and combinations of blocks included in the flowchart illustrations and/or block diagrams, may be implemented by one or more computer-executable program code portions. These one or more computer-executable program code portions may be provided to a processor of a special purpose computer in order to produce a particular machine, such that the one or more computer-executable program code portions, which execute via the processor of the computer and/or other programmable data processing apparatus, create mechanisms for implementing the steps and/or functions represented by the flowchart(s) and/or block diagram block(s).

It will also be understood that the one or more computer-executable program code portions may be stored in a transitory or non-transitory computer-readable medium (e.g., a memory, and the like) that can direct a computer and/or other programmable data processing apparatus to function in a particular manner, such that the computer-executable program code portions stored in the computer-readable medium produce an article of manufacture, including instruction mechanisms which implement the steps and/or functions specified in the flowchart(s) and/or block diagram block(s).

The one or more computer-executable program code portions may also be loaded onto a computer and/or other programmable data processing apparatus to cause a series of operational steps to be performed on the computer and/or other programmable apparatus. In some embodiments, this produces a computer-implemented process such that the one or more computer-executable program code portions which execute on the computer and/or other programmable apparatus provide operational steps to implement the steps specified in the flowchart(s) and/or the functions specified in the block diagram block(s). Alternatively, computer-implemented steps may be combined with operator and/or human-implemented steps in order to carry out an embodiment of the present invention.

While certain exemplary embodiments have been described and shown in the accompanying drawings, it is to be understood that such embodiments are merely illustrative of, and not restrictive on, the broader invention, and that this invention not be limited to the specific constructions and arrangements shown and described, since various other changes, combinations, omissions, modifications and substitutions, in addition to those set forth in the above paragraphs, are possible. Those skilled in the art will appreciate that various adaptations and modifications of the just described embodiments can be configured without departing from the scope and spirit of the invention. Therefore, it is to be understood that, within the scope of the appended claims, the invention may be practiced other than as specifically described herein.

What is claimed is:

1. A system for intelligently provisioning a distributed ledger technology (DLT) network, the system comprising:
    one or more processor components;
    one or more memory components operatively coupled to the one or more processor components;
    computer-readable instructions stored on the one or more memory components and configured to cause the one or more processor components to:
        receive a request from an authorized user to provision a DLT network;
        identify, based on the request received from an authorized user, a set of parameters required to provision the DLT network, wherein the set of parameters comprises at least one of a number of permissioned nodes and non-permissioned nodes in the provisioned DLT network;
        compare the set of parameters required to provision the DLT network with a set of parameters of a plurality of existing DLT network;
        determine one or more missing parameters based on at least the comparison of the set of parameters required to provision the DLT network with the set of parameters of the plurality of existing DLT network;
        predict, using one or more machine learning algorithms, the one or more missing parameters required to provision the DLT network;
        add the one or more missing parameters to the identified set of parameters;
        generate a script to provision the DLT network, wherein the script comprises a series of executable instructions based on the identified set of parameters instructing one or more nodes to provision a DLT network;
        transmit, to one or more nodes, the generated script to provision the DLT network; and
        execute the generated script to provision the DLT network.

2. The system of claim 1, wherein the set of parameters comprises at least one of a network infrastructure, a ledger type, a programming language, or a database.

3. The system of claim 1, wherein generating a script to provision the DLT network further comprises sequencing the series of executable instructions.

4. The system of claim 3, wherein transmitting the generated script to provision the DLT network comprises receiving an indication from a node when an executable instruction has been completed by the node and transmitting the next executable instruction in the sequenced series of executable instructions.

5. The system of claim 1, wherein transmitting the generated script to one or more nodes comprises communicating over a network with network provisioning adapter located at the one or more nodes.

6. The system of claim 1, wherein the computer-readable instructions stored on the one or more memory components are further configured to cause the one or more processor components to store the identified set of parameters in a database communicatively coupled to the system.

7. A computer program product for intelligently provisioning a distributed ledger technology (DLT) network, the computer program product comprising at least one non-transitory computer readable medium comprising computer readable instruction, the instructions comprising instructions for:
    receiving a request from an authorized user to provision a DLT network;
    identifying, based on the request received from an authorized user, a set of parameters required to provision the DLT network, wherein the set of parameters comprises at least one of a number of permissioned nodes and non-permissioned nodes in the provisioned DLT network;
    comparing the set of parameters required to provision the DLT network with a set of parameters of a plurality of existing DLT network;
    determining one or more missing parameters based on at least the comparison of the set of parameters required to provision the DLT network with the set of parameters of the plurality of existing DLT network;
    predicting, using one or more machine learning algorithms, the one or more missing parameters required to provision the DLT network;
    adding the one or more missing parameters to the identified set of parameters;
    generating a script to provision the DLT network, wherein the script comprises a series of executable instructions based on the identified set of parameters instructing one or more nodes to provision a DLT network;
    transmitting, to one or more nodes, the generated script to provision the DLT network; and
    executing the generated script to provision the DLT network.

8. The computer program product of claim 7, wherein the set of parameters comprises at least one of a number of nodes in the provisioned DLT network, a network infrastructure, a ledger type, a programming language, or a database.

9. The computer program product of claim 7, wherein generating a script to provision the DLT network further comprises sequencing the series of executable instructions.

10. The computer program product of claim 9, wherein transmitting the generated script to provision the DLT network comprises receiving an indication from a node when an executable instruction has been completed by the node and transmitting the next executable instruction in the sequenced series of executable instructions.

11. The computer program product of claim 7, wherein transmitting the generated script to one or more nodes comprises communicating over a network with network provisioning adapter located at the one or more nodes.

12. The computer program product of claim 7, further comprising storing the identified set of parameters in a database communicatively coupled to the system.

13. A method for intelligently provisioning a distributed ledger technology (DLT) network, the method comprising:
   receive a request from an authorized user to provision a DLT network;
      identifying, based on the request received from an authorized user, a set of parameters required to provision the DLT network, wherein the set of parameters comprises at least one of a number of permissioned nodes and non-permissioned nodes in the provisioned DLT network;
   compare the set of parameters required to provision the DLT network with a set of parameters of a plurality of existing DLT network;
   determine one or more missing parameters based on at least the comparison of the set of parameters required to provision the DLT network with the set of parameters of the plurality of existing DLT network;
      predict, using one or more machine learning algorithms, the one or more missing parameters required to provision the DLT network;
   add the one or more missing parameters to the identified set of parameters;
   generating a script to provision the DLT network, wherein the script comprises a series of executable instructions based on the identified set of parameters instructing one or more nodes to provision a DLT network;
   transmitting, to one or more nodes, the generated script to provision the DLT network; and
   executing the generated script to provision the DLT network.

14. The method of claim 13, wherein the set of parameters comprises at least one of a number of nodes in the provisioned DLT network, a network infrastructure, a ledger type, a programming language, or a database.

15. The method of claim 13, wherein generating a script to provision the DLT network further comprises sequencing the series of executable instructions.

16. The method of claim 15, wherein transmitting the generated script to provision the DLT network comprises receiving an indication from a node when an executable instruction has been completed by the node and transmitting the next executable instruction in the sequenced series of executable instructions.

17. The method of claim 13, wherein transmitting the generated script to one or more nodes comprises communicating over a network with network provisioning adapter located at the one or more nodes.

* * * * *